(12) United States Patent
Terayama

(10) Patent No.: US 7,469,099 B2
(45) Date of Patent: Dec. 23, 2008

(54) IMAGE-TAKING APPARATUS AND FOCUSING METHOD

(75) Inventor: Kota Terayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 11/153,148

(22) Filed: Jun. 15, 2005

(65) Prior Publication Data

US 2006/0002698 A1 Jan. 5, 2006

(30) Foreign Application Priority Data

Jun. 15, 2004 (JP) .............................. 2004-176896

(51) Int. Cl.
*G03B 3/10* (2006.01)
*G03B 13/34* (2006.01)
*G03B 13/24* (2006.01)
*H04N 5/232* (2006.01)
*G02B 7/04* (2006.01)
*G02B 27/64* (2006.01)

(52) U.S. Cl. ....................... 396/123; 396/150; 348/349; 250/201.2

(58) Field of Classification Search ................. 396/123, 396/89, 121, 96, 92, 150; 348/345, 347–349; 250/201.2, 201.4, 201.6
See application file for complete search history.

(56) References Cited

U.S. PATENT DOCUMENTS 5,589,911 A * 12/1996 Nonaka ........................ 396/80
2002/0146247 A1 * 10/2002 Nonaka ........................ 396/96

* cited by examiner

*Primary Examiner*—Rochelle-Ann J Blackman
(74) *Attorney, Agent, or Firm*—Cowan, Liebowitz & Latman, P.C.

(57) ABSTRACT

An image-taking apparatus is disclosed, which is capable of reducing the influence of the one-side blur by the automatic focusing function. The image-taking apparatus comprises a focus detector, which detects the focus state of the plurality of focus detection areas, and a selector, which selects a focus target area from a plurality of focus detection area based on the detection result of the focus detector. In a case where a first object distance to a first object is longer than a first predetermined distances and a second object distance to a second object, which exists on an outer side of the first object in the image-taking screen, is shorter than the first object distance by a second predetermined distance or more, the selector selects the focus detection area corresponding to the second object as the focus target area.

10 Claims, 9 Drawing Sheets

IMAGE-TAKING APPARATUS AND FOCUSING METHOD

FIELD OF THE INVENTION

The present invention relates to an image-taking apparatus capable of controlling focusing for a selected focus detection area of a plurality of focus detection areas.

BACKGROUND OF THE INVENTION

The improvement of image quality by the elevation of an automatic focusing function is increasingly required along with the popularization of digital cameras in recent years. The conventional AF apparatuses generally use the contrast detection method for focusing in which a focus lens position where the maximum value of the high frequency component in the luminance signal of an object image formed on an image-pickup element is obtained is determined as an in-focus position.

In addition, a camera is known, which has a plurality of focus detection areas in its image-taking screen and performs focusing for the closest-object-distance area of a plurality of focusable focus detection areas so that focusing on an object existing in an area other than the central area in the image-taking screen can be performed.

However, the inclination or center misalignment between the image-taking lens and the image-pickup element, or the inclination of lens units constituting the image-taking lens, which is caused by manufacturing error, deteriorates the accuracy of focus detection. Further, the automatic focusing on the basis of focus detection information with low accuracy causes a so-called one-side blur. The one-side blur means a state in which one side portion of the image-taking screen is in an in-focus state but the opposite side portion or the central portion thereof is in an out-of-focus state.

For solving the problems, a camera has been disclosed in Japanese Patent Laid-Open Application No. 2003-222787, in which the difference information between the object distances of the in-focus focus detection areas (hereinafter, it is referred to as an in-focus distance) is compared with a reference difference, and the focus control is changed according to whether the difference information is larger than the reference difference or not. According to Japanese Patent Laid-Open Application No. 2003-222787, to reduce the one-side blur, focusing on the central focus detection area is performed if the in-focus distances of the focus detection areas are the same.

However, the camera disclosed in Japanese Patent Laid-Open Application No. 2003-222787 has problems that it is difficult to obtain an in-focus state to an object in an area other than the central focus detection area, and it is difficult to obtain a best in-focus state to the same distance objects though a large blur does not occur.

For example, in a scene shown in FIG. 7, the focusing on a floor lamp S behind a table T located in the central area of the image-taking screen is performed if the in-focus distance difference between two persons P1 and P2 located on either side of the table T and the lamp S is less than a predetermined difference.

BRIEF SUMMARY OF THE INVENTION

One object of the present invention is to provide an image-taking apparatus and a focusing method capable of reducing the influence of the one-side blur by an excellent automatic focusing function.

According to an aspect, the present invention provides an image-taking apparatus that comprises: a focus detector, which detects the focus states at a plurality of focus detection areas provided in an image-taking screen; and a selector, which selects a focus target area from the plurality of focus detection areas based on the detection result of the focus detector, an image-taking lens being focused on an object in the focus target area. In a case where a first object distance to a first object is longer than a first predetermined distance, and a second object distance to a second object, which exists on an outer side of the first object in the image-taking screen, is shorter than the first object distance by a second predetermined distance or more, the selector selects the focus detection area corresponding to the second object as the focus target area.

According to another aspect, the present invention provides an image-taking apparatus that comprises: a focus detector, which detects the focus states at a plurality of image areas provided in an image-taking screen; and a selector, which selects a focus target area from the plurality of image areas based on the detection result of the focus detector, an image-taking lens being focused on an object in the focus target area. In a case where a first object distance to a first object displayed in a first screen area of an image-taking screen is longer than a first predetermined distance, and a second object distance to a second object displayed in a second screen area on an outer side of the first object in the image-taking screen, is shorter than the first object distance by a second predetermined distance or more, the selector selects the image area corresponding to the second object as the focus target area.

According to another aspect, the present invention provides a focus detection method comprising: a focus detection step of detecting the focus states at a plurality of focus detection areas provided in an image-taking screen; and a selection step of selecting a focus target area from the plurality of focus detection areas based on the detection result of the focus detection step, an image-taking lens being focused on an object in the focus target area. In the selection step, in a case where a first object distance to a first object is longer than a first predetermined distance, and a second object distance to a second object, which exists on an outer side of the first object in the image-taking screen, is shorter than the first object distance by a second predetermined distance or more, the focus detection area corresponding to the second object is selected as the focus target area.

According to another aspect, the present invention provides an image-taking apparatus that comprises: a focus detection step of detecting the focus states at a plurality of image areas provided in an image-taking screen; and a selection step of selecting a focus target area from the plurality of image areas based on the detection result of the focus detection step, an image-taking lens being focused on an object in the focus target area. In the selection step, in a case where a first object distance to a first object displayed in a first screen area of an image-taking screen is longer than a first predetermined distance, and a second object distance to a second object displayed in a second screen area on an outer side of the first object in the image-taking screen, is shorter than the first object distance by a second predetermined distance or more, the image area corresponding to the second object is selected as the focus target area.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Figure 1A:
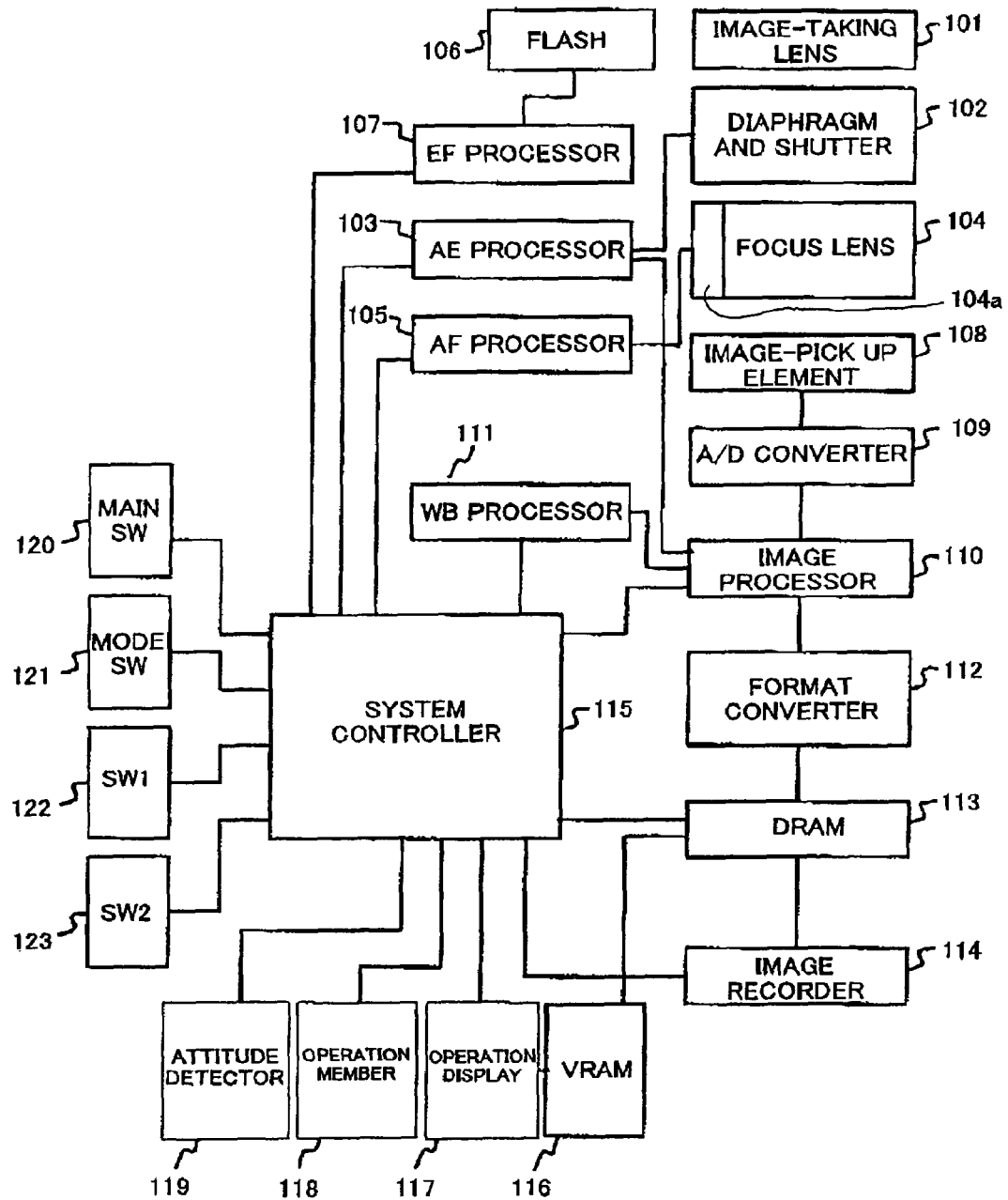
FIG. 1A is a block diagram showing the structure of the digital camera of an embodiment of the present invention.

FIG. 1A shows the structure of a digital camera 100 as an embodiment of the present invention. The digital camera 100 comprises an image-taking lens 101, a diaphragm/shutter 102, an automatic exposure (AE) processor 103, a focus lens 104, an automatic focus (AF) processor (driver) 105, an electric flash unit 106, an electric flash (EF) processor 107, an image-pickup element 108, an A/D converter 109, an image processor 110, a white balance (WB) processor 111, a format converter 112, a DRAM 113, a image recorder 114, a system controller 115, a VRAM 116, an operation display 117, operation members 118, an attitude detector 119, a main switch 120, a mode switch 121, a first stroke switch (SW1) 122, and a second stroke switch (SW2) 123.

The image-taking lens 101 includes a zoom mechanism, and makes an object image form on the image-pickup element 108. The diaphragm/shutter 102 controls a light amount. The AE processor 103 determines an exposure amount automatically based on the luminance of the object. The focus lens 104 forms an in-focus object image on the image-pickup element 108. The focus lens 104 shown in FIG. 1A includes a driving source (stepping motor, for example), not shown in the figure, and a detector (position detector) 104a that detects the driving amount thereof.

The AF processor 105 has a function of automatic focusing with the TTL (through the lens) technique and the contrast detection method that detects a focus state using a high frequency component of a signal showing the contrast of the object image on the image-pickup element 108. The image-pickup element 108 functions as a light-receiving element or photoelectric conversion element that converts the light reflected by the object into an electric signal. The A/D converter 109 has a function to convert analog data into digital data, and includes a correlation double sampling (CDS) circuit that eliminates the output noise of the image-pickup element 108 and a nonlinear amplifier that performs nonlinear amplification of the output of the image-pickup element 108 before the A/D conversion.

The image processor 110 performs predetermined pixel interpolation processing and color conversion processing for the data from the A/D converter 109. Further, the image processor 110 performs predetermined calculation processing using taken image data. The system controller 115 controls the AE processor 103, AF processor 105 and EF processor 107 based on the calculation results. The image processor 110 has an electronic zoom function converting the input image from the image-pickup element 108 into a displaying image that is displayed on the operation display 117.

As described above, the electronic zoom increases the zoom magnification by enlarging and displaying part of the image signal. In a case where further increase of the magnification is indicated after the zoom lens reached the telephoto end, the electronic zoom increases the magnification by enlarging part of the image signal, thereby achieving a higher magnification.

The WB processor 111 performs predetermined calculation processing for the taken image data, and performs AWB (automatic white balance) processing with the TTL technique based on the calculation results for the taken image data. The format converter 112 converts the format of the image data into a predetermined format such as the JPEG format. The DRAM 113 includes a high-speed built-in memory such as a random access memory, and is used as a high-speed buffer to memory the image data temporarily or a work memory for image compression and decompression.

The image recorder 114 includes a recording medium such as a semiconductor memory, and an interface for the medium. The system controller 115 controls the system in the operation sequence such as the image-taking sequence, and performs the processes shown in FIGS. 2 to 5. The VRAM 116 functions as an image displaying memory. The operation display 117 displays not only images but also indications for assisting operations, indications showing the camera status and, at the time of image-taking, indications showing the image-taking screen and focus detection areas. The operation display 117 includes an LCD, LED, speaker and the like.

The operation members 118 are used for operating the camera 100 from outside, and include a menu switch for various settings such as a setting of the image-taking function and a setting of image replaying, a zoom lever for indicating the zoom operation of the image-taking lens 101, an operation mode changing switch for changing the operation mode between an image-taking mode and a replaying mode, and an electronic zoom ON/OFF switch, for example.

The zoom lever is operated by an user for the zoom operation. The zoom lever can be operated between a telephoto (TELE) position to magnify the image, a wide-angle (WIDE) position to demagnify the image and an OFF position. The electronic zoom ON/OFF switch is operated for selecting whether the electronic zoom is used or not. The electronic zoom can be performed when the electronic zoom switch is ON, and the electronic zoom cannot be performed when the electronic zoom switch is OFF.

The attitude detector 119 outputs a signal according to the attitude of the camera 100 such as an erected attitude (horizontal attitude), an inverted attitude (upside down attitude), a left-sideways attitude (lower grip attitude), a right-sideways attitude (upper grip attitude), an anteverted attitude (lower lens attitude) and a retroverted attitude (upper lens attitude). The system controller 115 can detect the attitude of the camera 100 based on the signal. Based on the attitude information detected by the attitude detector 119, the system controller 115 changes the weighting for the photometry evaluation and AF, and performs rotation processing of the image taken in the vertical attitude (the left-sideways attitude or the right-sideways attitude) to display the image rotated to the vertical position on the operation display 117.

The main switch 120 is a switch for turning on the power of the system. The mode switch 121 is a switch for setting the image-taking mode such as a program mode, a landscape mode and a portrait mode. The first stroke switch 122 (SW1) is turned on by a half-push operation of a release switch, not shown in the figure, and is a switch for starting the image-taking preparation operation such as the AF and the AE. The second stroke switch 123 (SW2) is turned on by a full-push operation of the release switch, and is a switch for starting the image-taking operation (operation for recording the taken image to the recording medium).

Figure 1B:
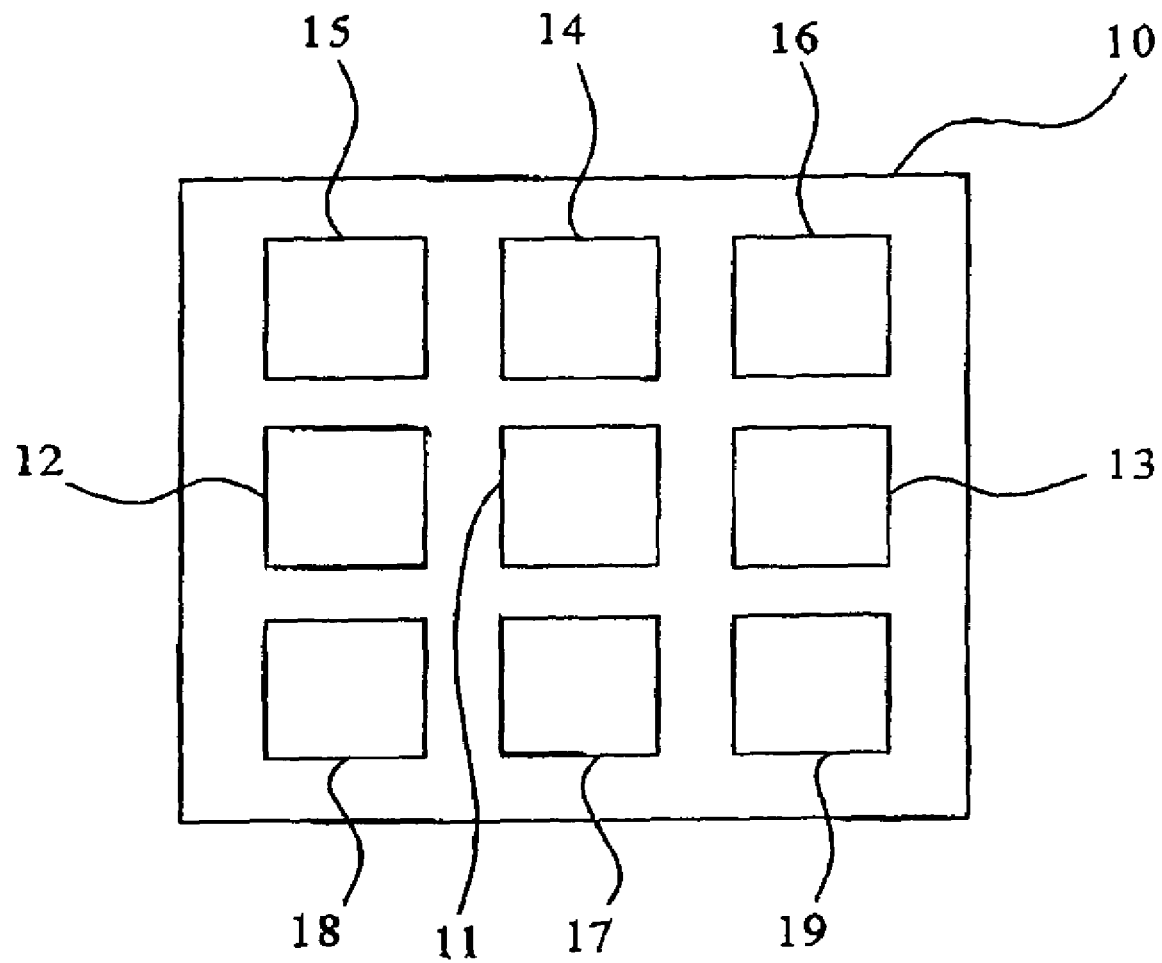
FIG. 1B is a schematic view showing a focus detection area of the digital camera shown in FIG. 1A.

FIG. 1B shows the arrangement of the focus detection area in the digital camera 100 of the present invention. In this figure, reference numeral 10 denotes the image-taking screen (field angle area of image-taking). In the image-taking screen 10, nine focus detection areas (image areas) are provided, which include a focus detection area 11 located at the center, focus detection areas 12 and 13 located on either side of the central focus detection area 11, these focus detection areas 11 to 13 constituting the middle area, and include the upper and lower areas each including three focus detection areas (14 to 19).

Figure 2:
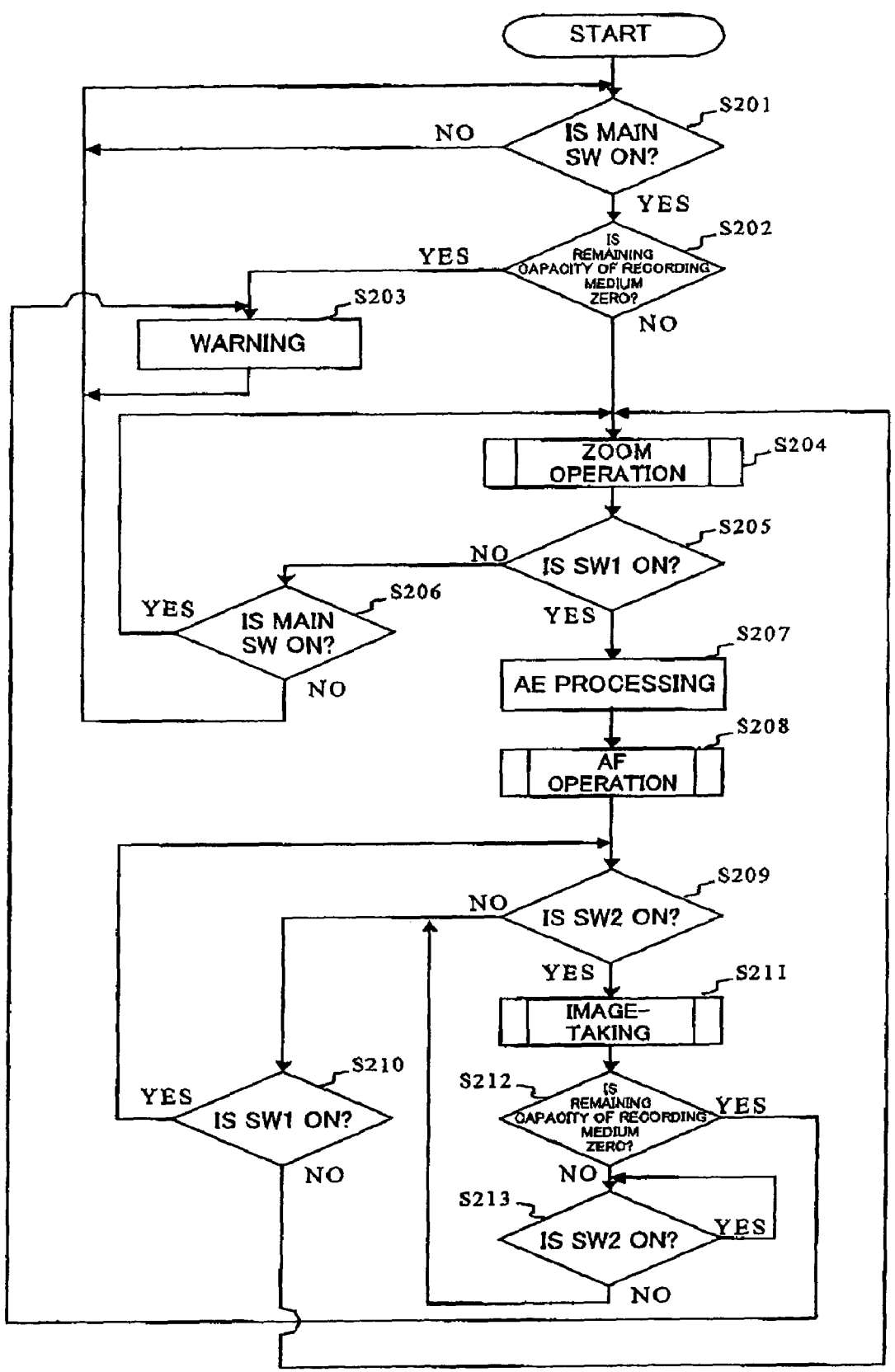
FIG. 2 shows a flowchart of the operation of the digital camera shown in FIG. 1A.

Hereinafter, the description will be given of the operation of the digital camera 100 with reference to FIG. 2. FIG. 2 is a flowchart for describing the operation of the digital camera 100.

First, the system controller 115 determines whether the main switch 120 is turned on or not (step S201). If the main switch 120 is on, the system controller 115 determines whether the capacity of the recording medium in the image recorder 114 remains or not (step S202). If the remaining capacity is zero, the system controller 115 warns that the remaining capacity is zero (step S203), and returns to the step S201. The warning of the image recorder 114 can be performed by displaying it on the operation display 117 or outputting a warning sound from a speaker, not shown in the figure. Both of these may be performed.

Figure 3:
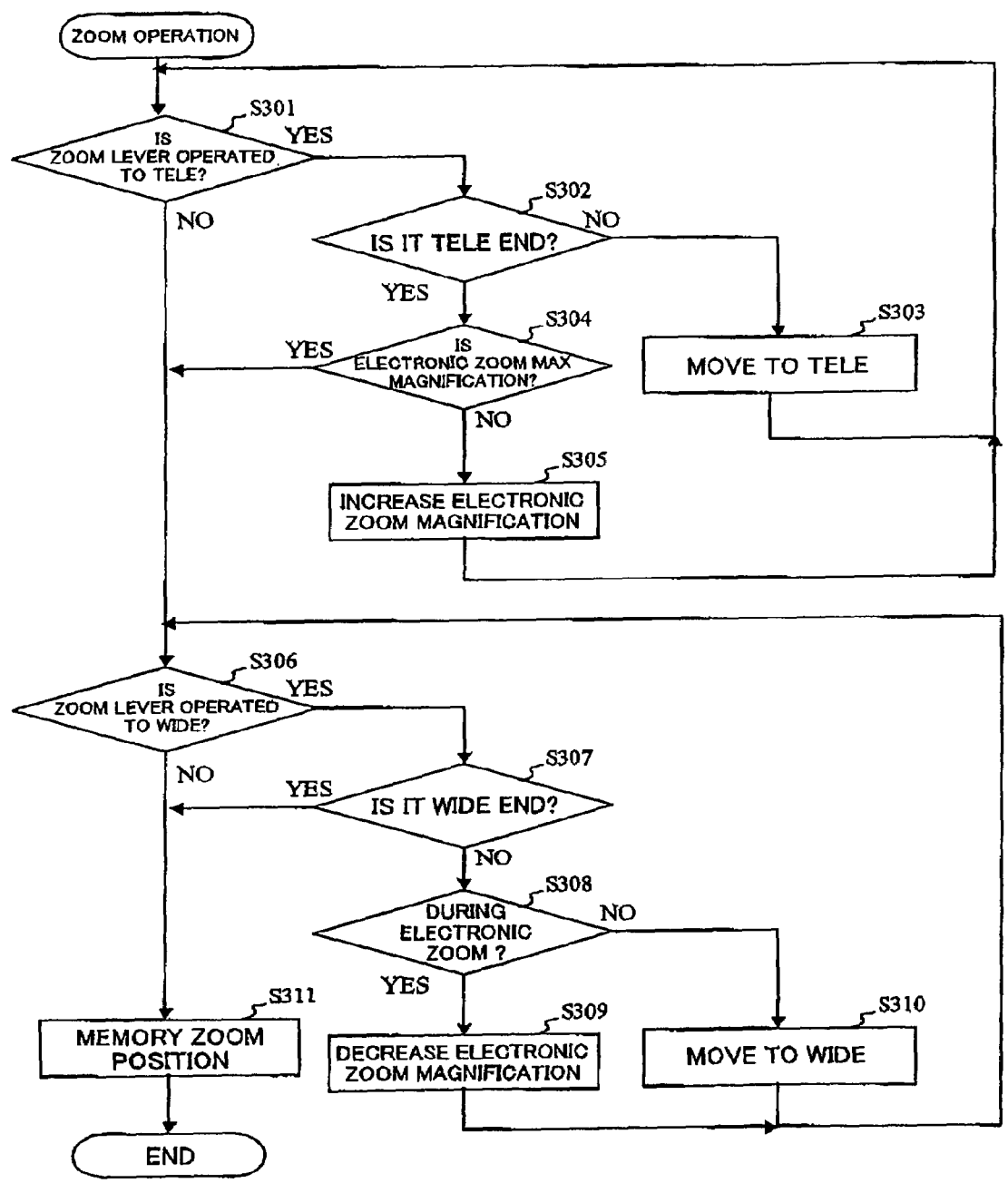
FIG. 3 shows a subroutine's flowchart of the zoom operation shown in FIG. 2.

If the remaining capacity is not zero (step S202), the system controller 115 performs the zoom operation (step S204). The description will hereinafter be given of the zoom operation in the step S204 with reference to FIG. 3. FIG. 3 is a flowchart of the subroutine for the zoom operation.

The system controller 115 determines whether the zoom lever included in the operation members 118 is operated to the TELE position or not (step S301). If the zoom lever is operated to the TELE position, the system controller 115 determines whether the zoom position of the image-taking lens 101 is located at the TELE end or not (step S302). If the zoom position is not located at the TELE end, the system controller 115 moves the zoom position to the TELE end (step S303), and returns to the step 301.

On the other hand, if the zoom position is located at the TELE end (step S302), the system controller 115 determines whether the magnification of the electronic zoom by the image processor 110 is set to the maximum value or not (step S304). If the magnification of the electronic zoom is not set to the maximum value, the system controller 115 increases the magnification of the electronic zoom (step S305), and then returns to the step S301.

On the other hand, if the zoom lever is not operated to the TELE position (step S301) or the magnification of the electronic zoom is set to the maximum value (step S304), the system controller 115 determines whether the zoom lever is operated to the WIDE position or not (step S306). If the zoom lever is operated to the WIDE position, the system controller 115 determines whether the zoom position of the image-taking lens 101 is located at the WIDE end or not (step S307). If the zoom position is not located at the WIDE end, the system controller 115 determines whether the image processor 110 is using the electronic zoom or not (step S308).

If the image processor 110 is using the electronic zoom (step S308), the system controller 115 decreases the magnification of the electronic zoom (step S309), and then returns to the step S306. On the other hand, if the image processor 110 is not using the electronic zoom (step S308), the system controller 115 moves the zoom position of the image-taking lens 101 to the WIDE side (step S310), and then returns to the step S306.

If the zoom lever is not operated to the WIDE position (step S306) or the zoom position of the image-taking lens 101 is located at the WIDE end (step S307), the system controller 115 stores the current zoom position of the image-taking lens 101 to a calculation memory that is not shown in the figure and built in the system controller 115 (step S310).

In FIG. 2, the system controller 115 determines whether the first stroke switch SW1 is turned on or not after the zoom operation in the step S204 (step S205). If the first stroke switch SW1 is off, the system controller 115 determines whether the main switch 120 is on or not (step S206). If the main switch 120 is on, the system controller 115 returns to the step S204.

If the main switch 120 is off (step S206), the system controller 115 returns to the step S201. On the other hand, if the first stroke switch SW1 is on (step S205), the system controller 115 commands the AE processor 103 to perform the AE processing based on the output from the image processor 110 (step S207).

Figure 4A:
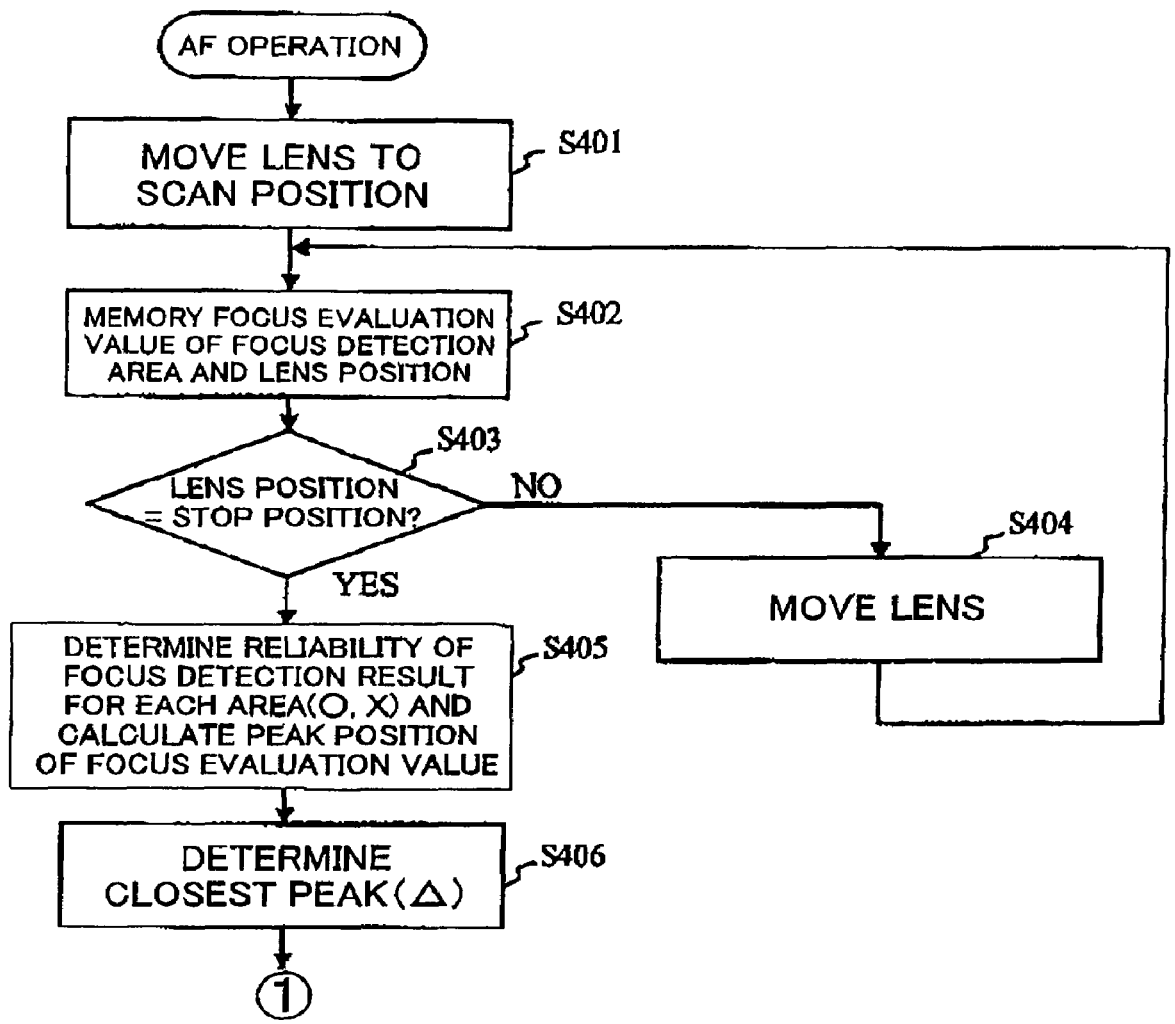
FIGS. 4A and 4B show a subroutine's flowchart of the image-taking operation shown in FIG. 2.
Figure 4B:
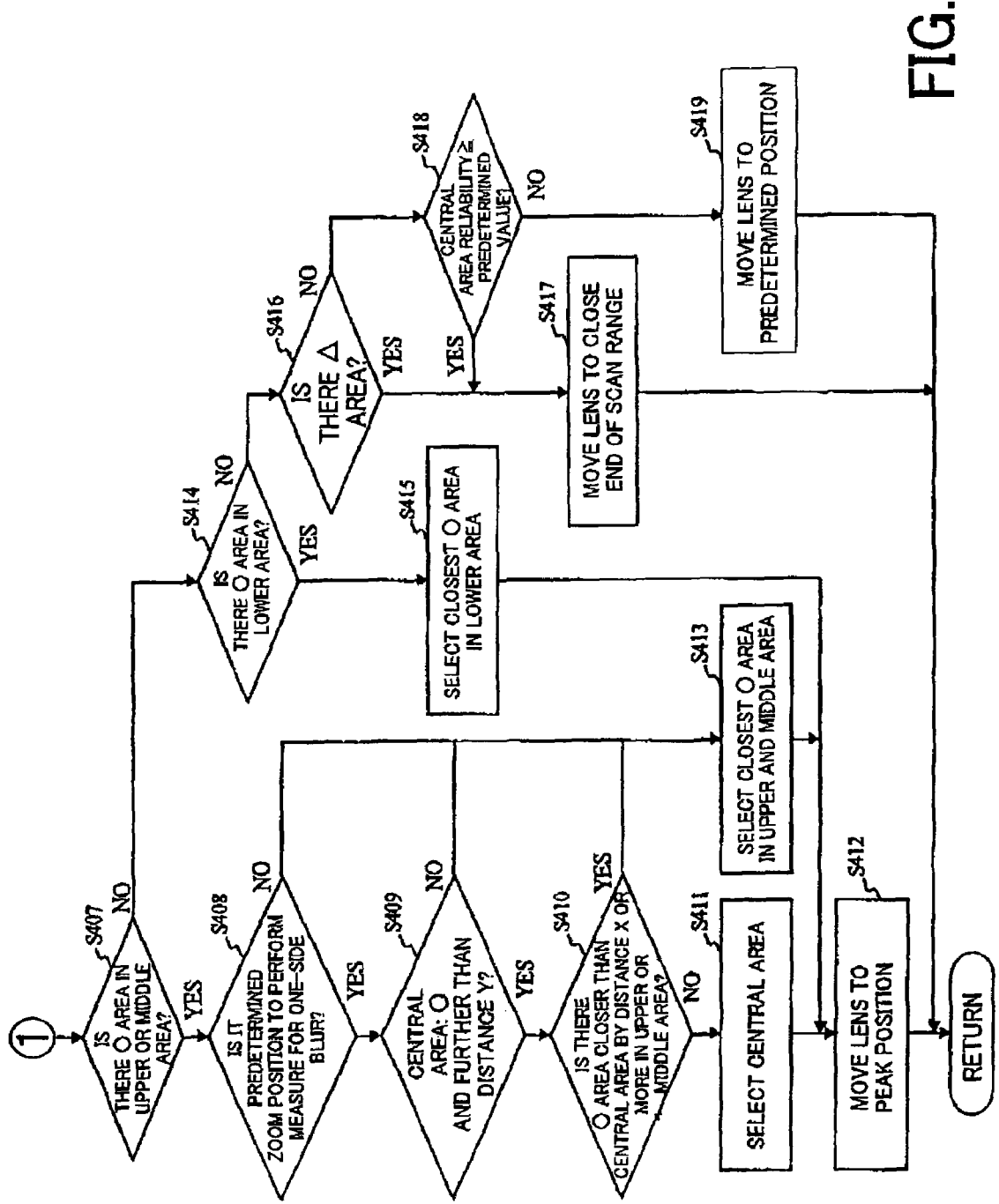

Next, the system controller 115 performs the AF operation (step S208). The description will hereinafter be given of the AF operation in the step S208 with reference to FIGS. 4A and 4B. FIGS. 4A and 4B shows a flowchart of the subroutine for the AF operation.

The AF operation is performed by the method in which the focus lens 104 is driven between the infinite end and the closest end (hereinafter, this drive is referred to as 'scanning'), and the position where the value of the high frequency component (hereinafter, it is referred to as an AF evaluation value) of the signal from the image-pickup element 108 becomes the peak value during the scanning is determined as an in-focus lens position. The scanning of the focus lens 104 is performed for each of the nine focus detection areas 11 to 19. Different in-focus lens positions are determined for the focus detection areas corresponding to different object distances.

First, the system controller 115 moves the focus lens 104 to a scanning start position (step S401). The scanning start position is set to the infinite end in the present embodiment. After starting the scanning, the system controller 115 stores the AF evaluation value for each focus detection area provided in the image-taking screen and the position of the focus lens 104 (focus lens position) where each AF evaluation value has been obtained to the calculation memory, which is not shown in the figure and built in the system controller 115 (step S402). The focus lens position can be detected via a detector, not shown in the figure, as a relative position corresponding to the driving amount of the driving part of the focus lens 104 from a predetermined reset position.

Next, the system controller 115 determines whether or not the focus lens position is located at the scanning end position (step S403). The scanning end position is set to the closest end in the present embodiment. If the focus lens position is not located at the scanning end position (step S403), the system controller 115 moves the focus lens 104 in the direction to the closest end by a predetermined amount (step S404).

If the focus lens position is located at the scanning end position (step S403), the system controller 115 judges the reliability of the focus detection result based on the AF evaluation value for each focus detection area stored in the step S402 and the focus lens position. Further, for the focus detection area with the sufficient reliability, the system controller 115 calculates the focus lens position (in-focus lens position) where the AF evaluation value becomes the peak value (step S405).

The system controller 115 judges the reliability by calculating a reliability evaluation value $E_{val}$ using Expression (1), for example. $V_{max}$ and $V_{min}$ denote the maximum and minimum values of the AF evaluation value in a certain focus detection area, and k denotes the normalization constant. The reliability is judged to be high (hereinafter, it is referred to as 'O') if the reliability evaluation value $E_{val}$ is equal to 1 or more. The reliability is judged to be low (hereinafter, it is referred to as 'x') if the reliability evaluation value $E_{val}$ is less than 1. The O-judged focus detection area is a focusable focus detection area (hereinafter, it is referred to as a focusable area).

$$E_{val}=k(V_{max}-V_{min}) \qquad (1)$$

Next, the system controller 115 determines whether the maximum AF evaluation value is obtained at the closest end of the focus lens position for each focus detection area or not (step S406). If the maximum AF evaluation value is obtained, the system controller 115 judges to be 'Δ'. The Δ-judgment means that any object exists in a region closer than the scanning region.

Next, the system controller 115 determines whether or not the O-judged focus detection area is included in the focus detection areas 11 to 16 in the upper or middle area (first screen area) of the image-taking screen, in a case where, for example, the attitude of the camera 100 detected by the attitude detector 119 is the erected attitude (step S407). If the O-judged focus detection area is included in the upper or middle area, the system controller 115 determines whether or not the zoom position of the image-taking lens 101 is located at the position where the measure for the one-side blur should be performed (step S408). This is for preventing the deterioration of the one-side blur at a certain zoom position by the configuration of the image-taking lens 101 or the like.

If the zoom position of the image-taking lens 101 is located at the position where the measure for the one-side blur should be performed, the system controller 115 determines whether or not the central focus detection area 11 is the O-judged focus detection area and a first object distance of the central focus detection area 11, that is, a distance to an object included in the central focus detection area 11, is longer than a first predetermined distance Y as a function of the zoom position (focal length) (step S409).

This is for examining whether or not the image to be taken is a distant view image, which is greatly affected by the one-side blur, and the O-judgment required for performing the focusing has been given to the central focus detection area 11. The object distance can be calculated based on the detection result of the focus lens position by using the relationship that the object distance becomes longer as the focus lens position becomes closer to the infinite end and the object distance becomes shorter as the focus lens position becomes closer to the closest end.

When it is Yes in the step S409, the system controller 115 determines whether or not a focus detection area in which the object distance is shorter than the first object distance of the central focus detection area 11 by a second predetermined distance X or more is included in the O-judged focus detection areas in the upper or middle area (step S410). This is the determination for taking a commemorative photo or the like with a landscape as the background. In this case, the focus control for the central focus detection area 11 corresponding to the background is not performed because pan focus control or focusing on the person is performed.

Here, the first predetermined distance Y for determining whether or not it is a distant view in the step S409 and the second predetermined distance X that is a reference of the difference from the object distance of the central focus detection area 11 are functions of the zoom position. In other words, these distances are changed according to the zoom position. This is because the depth of field changes according to the zoom position.

If it is NO in the step S410, the system controller 115 selects the central focus detection area 11 as a focus target area where the in-focus state is obtained by driving the focus lens 104 (step S411). The system controller 115 drives the focus lens 104 to the position (in-focus position) where the AF evaluation value of the selected central focus detection area 11 became the peak value in the step S405, and thereby achieving the focus control for central focus detection area 11 (step S412).

Figure 5:
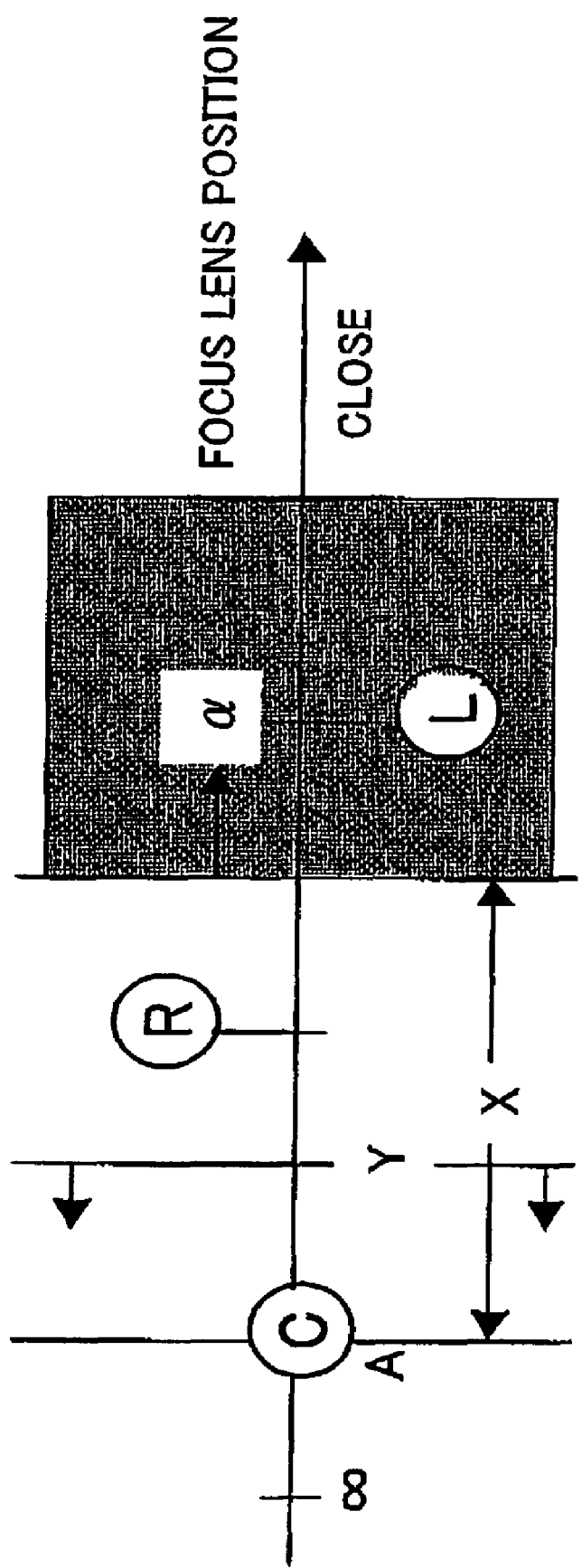
FIG. 5 is a pattern diagram for explaining the selection of the focus detection area in the AF operation shown in FIGS. 4A and 4B.

An example of the selection operation of the focus detection area in the steps S409 and S410 will hereinafter be explained with reference to FIG. 5. FIG. 5 is a schematic view for explaining the selection of the focus detection area, and shows only the central focus detection area 11 shown as 'C', the left focus detection area 12 shown as 'L', and the right focus detection area 13 shown as 'R' in the middle area of the image-taking screen for simplifying the explanation.

In FIG. 5, the object distance A, that is, the distance to the floor lamp S, of the central focus detection area 11 is longer than the first predetermined distance Y. When the central focus detection area 11 is the O-judged focus detection area, the system controller 115 determines whether or not the left focus detection area 12 in which the object distance α (distance to the person P1) is shorter than the object distance A by the second predetermined distance X or more, is the O-judged focus detection area.

If the left focus detection area 12 is the O-judged focus detection area, the system controller 115 selects the left focus detection area 12 as the focus target area, and then drives the focus lens 104 to perform the focus control for the left focus detection area 12.

On the other hand, if the left focus detection area 12 is the x-judged focus detection area, since the object distance of the right focus detection area 13 is not shorter than the object distance A by the second predetermined distance X or more (in other words, the object distance of the right focus detection area 13 is shorter than the object distance A by a distance less than the second predetermined distance X), the system controller 115 selects the central focus detection area 11 as the focus target area, and then drives the focus lens 104 to perform the focus control for the central focus detection area 11.

If both the left and right focus detection areas 12 and 13 are the O-judged focus detection areas, and the object distances of the left and right focus detection areas 12 and 13 are shorter than the object distance A by the second predetermined distance X or more, the system controller 115 selects the focus detection area having shorter object distance of these focus detection areas 12 and 13, that is, the shortest-object-distance focus detection area as the focus target area.

Although the upper and middle areas are the determination object in the steps S407 and S410 in FIG. 4B, this is only an example. The determination object in the steps S407 and S410 will be changed according to the detection result of the attitude detector 119. Accordingly, the determination object in the after-mentioned step S414 will be changed from the lower area.

In FIG. 4B, in a case where the zoom position is not a position where the measure for the one-side blur should be performed (step S408), in a case where it is NO in the step S409, and in a case where it is YES in the step S410, the system controller 115 selects, from the O-judged focus detection areas in the upper and middle areas, the focus detection area in which the in-focus lens position obtained in the step S405 corresponds to the closest object distance as the focus target position (step S413).

On the other hand, when no O-judged focus detection area is included in the focus detection areas 11 to 16 in the upper and middle areas (step S407), the system controller 115 determines whether or not the O-judged focus detection area is included in the focus detection areas 17 to 19 in the lower area, according to the camera attitude detected by the attitude detector 119 (step S414).

If the O-judged focus detection area is included in the focus detection areas 17 to 19 in the lower area, the system controller 115 selects, from the O-judged focus detection areas in the lower areas, the focus detection area in which the in-focus lens position obtained in the step S405 corresponds to the closest object distance as the focus target position (step S415). Then, the process progresses to the step S412.

On the other hand, if no O-judged focus detection area is included in the focus detection areas 17 to 19 in the lower area (step S414), the system controller 115 determines whether or not the Δ-judged focus detection area judged in the step S406 is included in the focus detection areas 17 to 19 in the lower area (step S416). If the Δ-judged focus detection area is included in the lower area, the system controller 115 moves the focus lens 104 to the closest end (step S417). Then, the process progresses to the step S412.

If no Δ-judged focus detection area is included in the lower area (step S416), the system controller 115 determines whether or not the reliability evaluation value $E_{val}$ of the central focus detection area 11 obtained in the step S405 is equal to a predetermined value or more (step S418). If the reliability evaluation value $E_{val}$ is equal to the predetermined value or more, the process progresses to the step S417. If the reliability evaluation value $E_{val}$ is less than the predetermined value, the system controller 115 drives the focus lens 104 to a predetermined position (step S419).

Again, in FIG. 2, the system controller 115 determines whether the second stroke switch SW2 is on or not after the AF operation in the step S208 (step S209). If the second stroke switch SW2 is off, the system controller 115 determines whether the first stroke switch SW1 is on or not (step S210). If the first stroke switch SW1 is on, the system controller 115 returns to the step S209. If the first stroke switch SW1 is off, the system controller 115 returns to the step S204.

Figure 6:
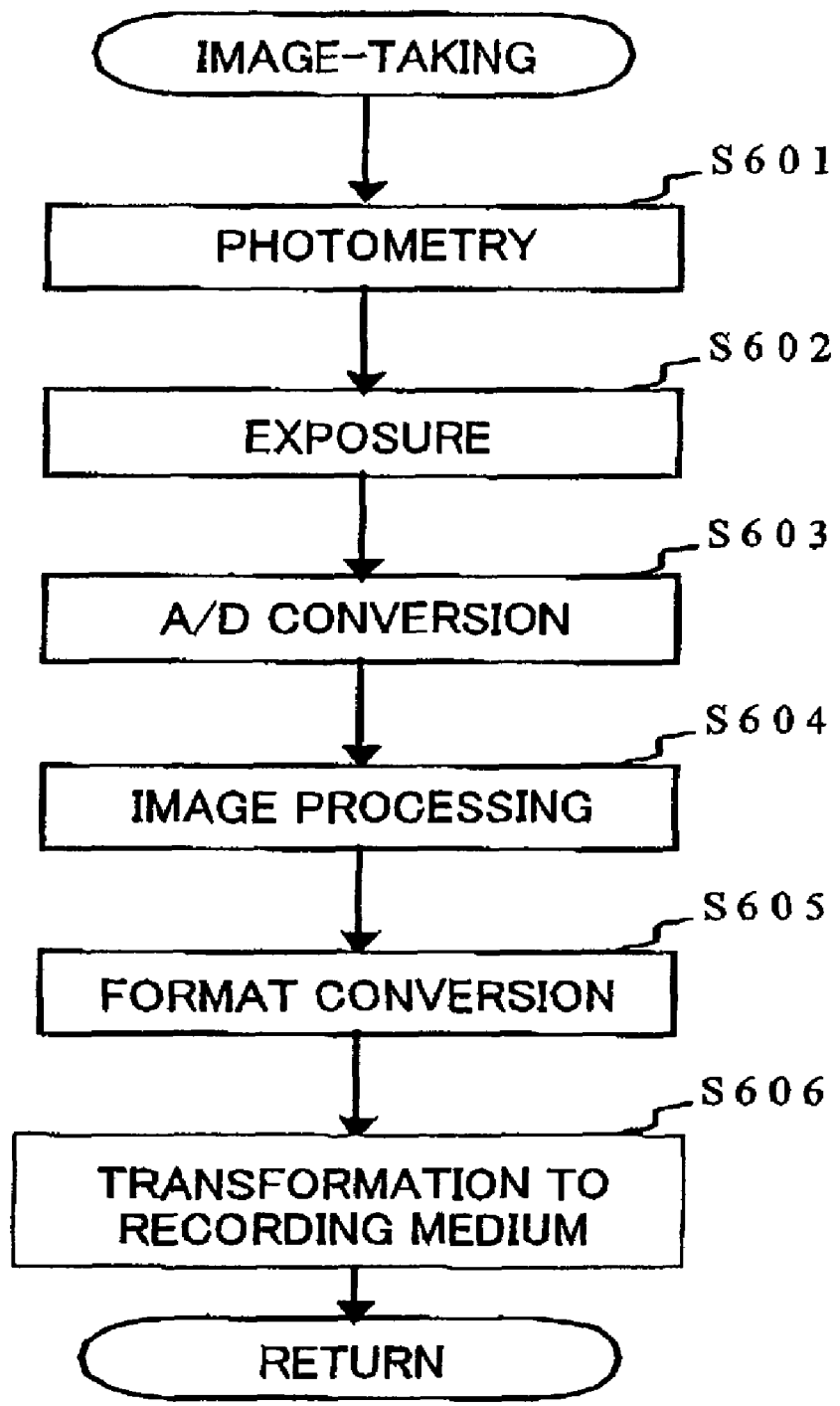
FIG. 6 shows a subroutine's flowchart of the image-taking operation shown in FIG. 2.
Figure 7:
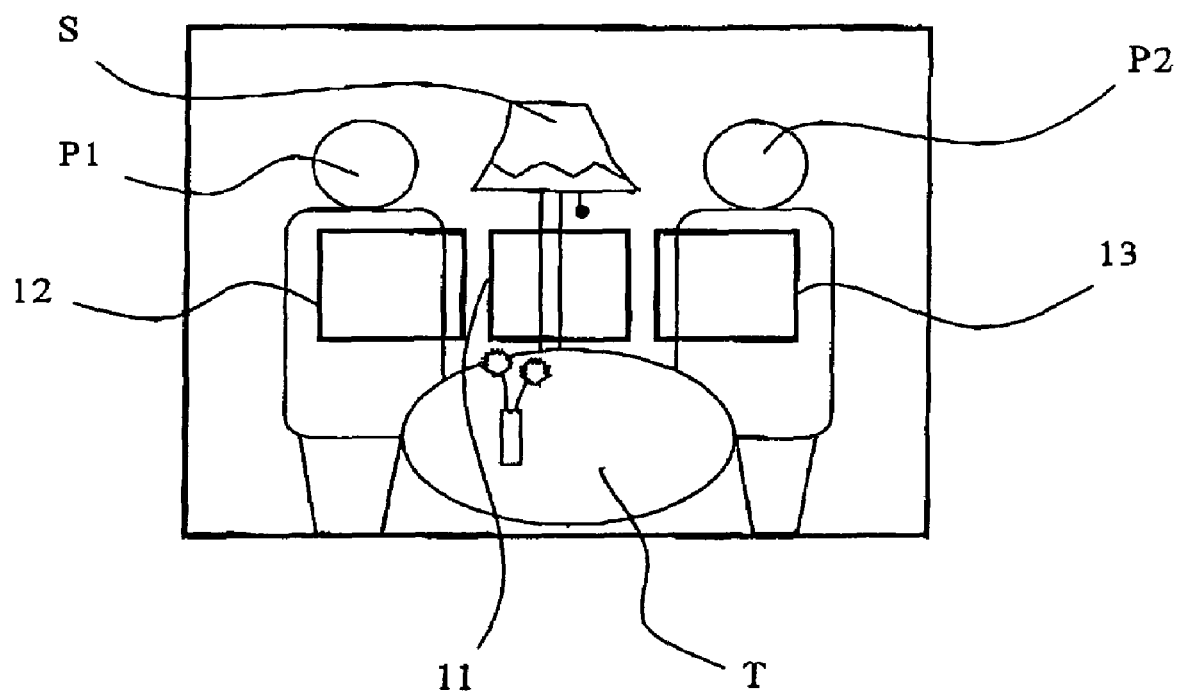
FIG. 7 shows an example scene in which a one-side blur occurs.

If the second stroke switch SW2 is on (step S209), the system controller 115 performs the image-taking operation (step S211). The image-taking operation will hereinafter be explained with reference to FIG. 6. FIG. 6 shows a flowchart of the subroutine of the image-taking operation.

First, the system controller 115 measures the object luminance (step S601). Next, the system controller 115 performs the exposure of the image-pickup element 108 by controlling the charge storage time and the operation of the diaphragm/shutter 102 according to the object luminance measured in the step S601 (step S602). The object image formed on the image-pickup element 108 is photoelectrically converted into an analog signal, and the signal is sent to the A/D converter 109. The A/D converter 109 converts the analog signal into a digital signal after the preprocessing such as the elimination of output noises and the nonlinear processing (step S603).

Next, the WB processor 111 adjusts the white balance of the output signal from the A/D converter 109 in the image processor 110 to form an adequate output image signal (step S604). Next, the format converter 112 converts the output image signal into a predetermined format data such as the JPEG format data, and then the data is stored to the DRAM 113 temporarily (step S605). Next, the data stored in the DRAM 113 is transferred to the image recorder 114, and recorded to the recording medium such as a memory in the camera 100 or memory card attached to the camera 100 (step S606).

Again, in FIG. 2, the system controller 115 determines whether the capacity of the recording medium in the image recorder 114 remains or not (step S212). If the remaining capacity of the recording medium is zero, the system controller 115 performs the warning indicating that the remaining capacity is zero (step S213), and then returns to the step S201.

On the other hand, if the remaining capacity of the recording medium is not zero (step S212), the system controller 115 determines whether the second stroke switch SW2 is on or not (step S213). If the second stroke switch SW2 is off, the system controller 115 returns to the step S209. If the second stroke switch SW2 is on, the system controller 115 repeats the step S213.

As described above, according to the digital camera 100 of the present embodiment, when taking an image including a distant view such as landscape in the center area, which is greatly affected by the one-side blur, the focus control for the focus detection area in which the object is closer than the object distance of the central focus detection area by a predetermined distance is performed. Therefore, it is possible to ensure the in-focus accuracy for the object corresponding to the focus detection area provided in an area other than the center of the image-taking screen. In other words, it is possible to achieve the focus control that the influence of the one-side blur is effectively reduced.

The description was given of the embodiment in which one focus detection area is provided at the center of the image-taking screen. However, a plurality of focus detection areas as central focus detection areas may be provided in a predetermined-sized area including the center, and further a plurality of focus detection areas may be provided around the central focus detection areas.

This application claims a foreign priority benefit based on Japanese Patent Applications No. 2004-176896, filed on Jun. 15, 2004, which is hereby incorporated by reference herein in its entirety as if fully set forth herein.

What is claimed is:

1. An image-taking apparatus comprising:
a focus detector, which detects focus states at a plurality of focus detection areas provided in an image-taking screen; and
a selector, which selects a focus target area from the plurality of focus detection areas based on a detection result of the focus detector, an image-taking lens being focused on an object in the focus target area,
wherein, in a case where a first object distance to a first object is longer than a first predetermined distance, and a second object distance to a second object, which exists on an outer side of the first object in the image-taking screen, is shorter than the first object distance by a second predetermined distance or more, the selector selects the focus detection area corresponding to the second object as the focus target area, and, in a case where the first object distance is shorter than the first predetermined distance, the selector selects the focus detection area corresponding a nearest object as the focus target area.

2. The image-taking apparatus according to claim 1, wherein, in a case where plural second objects exist, the selector selects the focus detection area corresponding to one of the second objects whose distance is shorter than those of the others as the focus target area.

3. The image-taking apparatus according to claim 1, wherein, in a case where the first object distance is longer than the first predetermined distance, and the second object distance is shorter than the first object distance by a distance less than the second predetermined distance, the selector selects the focus detection area corresponding to the first object as the focus target area.

4. The image-taking apparatus according to claim 1, wherein the first and the second predetermined distances are changed in accordance with a focal length of the image-taking lens.

5. The image-taking apparatus according to claim 1, further comprising a driver, which drives a focus lens so that the image-taking lens is focused on the object in the focus target area.

6. An image-taking apparatus comprising:
a focus detector, which detects focus states at a plurality of image areas provided in an image-taking screen; and
a selector, which selects a focus target area from the plurality of image areas based on detection result of the focus detector, an image-taking lens being focused on an object in the focus target area,
wherein, in a case where a first object distance to a first object displayed in a first screen area of an image-taking screen is longer than a first predetermined distance, and a second object distance to a second object displayed in a second screen area on an outer side of the first object in the image-taking screen, is shorter than the first object distance by a second predetermined distance or more, the selector selects the image area corresponding to the second object as the focus target area, and, in a case where the first object distance is shorter than the first predetermined distance, the selector selects the image area corresponding a nearest object as the focus target area.

7. The image-taking apparatus according to claim 6, wherein, in a case where no focusable area is included in the first screen area, the selector selects the image area corresponding to the nearest object in the second screen area as the focus target area.

8. The image-taking apparatus according to claim 6, further comprising an attitude detector, which detects an attitude of the image-taking apparatus, and
wherein the selector changes the first and second screen areas in accordance with a detection result of the attitude detector.

9. A focusing method comprising:
a focus detection step of detecting focus states at a plurality of focus detection areas provided in an image-taking screen; and
a selection step of selecting a focus target area from the plurality of focus detection areas based on a detection result of the focus detection step, an image-taking lens being focused on an object in the focus target area,
wherein, in the selection step, in a case where a first object distance to a first object is longer than a first predetermined distance, and a second object distance to a second object, which exists on an outer side of the first object in the image-taking screen, is shorter than the first object distance by a second predetermined distance or more, the focus detection area corresponding to the second object is selected as the focus target area, and, in a case where the first object distance is shorter than the first predetermined distance, the focus detection area corresponding a nearest object is selected as the focus target area.

10. A focusing method comprising:
a focus detection step of detecting focus states at a plurality of image areas provided in an image-taking screen; and
a selection step of selecting a focus target area from the plurality of image areas based on a detection result of the focus detection step, an image-taking lens being focused on an object in the focus target area,
wherein, in the selection step, in a case where a first object distance to a first object displayed in a first screen area of an image-taking screen is longer than a first predetermined distance, and a second object distance to a second object displayed in a second screen area on an outer side of the first object in the image-taking screen, is shorter than the first object distance by a second predetermined distance or more, the image area corresponding to the second object is selected as the focus target area, and, in a case where the first object distance is shorter than the first predetermined distance, the image area corresponding a nearest object is selected as the focus target area.

* * * * *